(12) United States Patent
Chaudhuri et al.

(10) Patent No.: US 8,332,388 B2
(45) Date of Patent: Dec. 11, 2012

(54) TRANSFORMATION RULE PROFILING FOR A QUERY OPTIMIZER

(75) Inventors: Surajit Chaudhuri, Redmond, WA (US); Leo Giakoumakis, Redmond, WA (US); Vivek Narasayya, Redmond, WA (US); Ravi Ramamurthy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 12/818,237

(22) Filed: Jun. 18, 2010

(65) Prior Publication Data

US 2011/0314000 A1 Dec. 22, 2011

(51) Int. Cl.
*G06F 7/00* (2006.01)
*G06F 17/30* (2006.01)

(52) U.S. Cl. .................................. 707/718; 707/765
(58) Field of Classification Search .................. None
See application file for complete search history.

(56) References Cited

U.S. PATENT DOCUMENTS

| | | | | |
|---|---|---|---|---|
| 5,544,355 | A * | 8/1996 | Chaudhuri et al. ............ | 1/1 |
| 5,819,255 | A * | 10/1998 | Celis et al. ............ | 1/1 |
| 5,822,747 | A * | 10/1998 | Graefe et al. ............ | 1/1 |
| 6,240,406 | B1 * | 5/2001 | Tannen ............ | 1/1 |
| 6,289,334 | B1 * | 9/2001 | Reiner et al. ............ | 1/1 |
| 6,356,889 | B1 | 3/2002 | Lohman et al. | |
| 6,615,203 | B1 * | 9/2003 | Lin et al. ............ | 1/1 |
| 6,957,211 | B1 | 10/2005 | Tyulenev et al. | |
| 7,194,451 | B2 | 3/2007 | Chaudhuri et al. | |
| 7,194,452 | B2 | 3/2007 | Galindo-Legaria et al. | |
| 2003/0009450 | A1 * | 1/2003 | Kiernan et al. ............ | 707/3 |
| 2003/0093415 | A1 * | 5/2003 | Larson et al. ............ | 707/3 |
| 2003/0172059 | A1 * | 9/2003 | Andrei ............ | 707/3 |
| 2005/0050041 | A1 * | 3/2005 | Galindo-Legaria et al. ...... | 707/4 |
| 2005/0154757 | A1 * | 7/2005 | Barsness et al. ............ | 707/104.1 |
| 2005/0187917 | A1 | 8/2005 | Lawande et al. | |
| 2005/0198016 | A1 * | 9/2005 | Cunningham et al. ............ | 707/3 |
| 2005/0210023 | A1 * | 9/2005 | Barrera et al. ............ | 707/5 |
| 2006/0230017 | A1 * | 10/2006 | Larson et al. ............ | 707/2 |
| 2006/0248045 | A1 * | 11/2006 | Toledano et al. ............ | 707/2 |
| 2006/0253422 | A1 * | 11/2006 | Narasayya et al. ............ | 707/2 |

(Continued)

OTHER PUBLICATIONS

Optimizing Recursive Information Gathering Plans, Lambrecht et al, Optimizing recursive information gathering plans. Proc. 16th International Joint Conference on Artificial Intelligence. pp. 1204-1211, 1999.*

(Continued)

*Primary Examiner* — Fred I Ehichioya
*Assistant Examiner* — Augustine K Obisesan
(74) *Attorney, Agent, or Firm* — Powell IP Law, PLLC; Tracy Powell

(57) ABSTRACT

Technology is described for transformation rule profiling for a query optimizer. The method can include obtaining a database query configured to be optimized by the query optimizer of a database system. An optimized query plan for the database query can be found using a host set of transformation rules. One transformation rule can be removed and checked at a time. Each transformation rule can be checked to determine whether the transformation rule affects an optimal query plan output. A test query plan can be generated after each transformation rule has been removed. The query optimizer can determine whether the test query plan is different than the optimized query plan in the absence of the removed transformation rule. An equivalent set of transformation rules can be created that includes transformation rules where the test query plan generated from the equivalent set of transformations rules is equivalent to the optimized plan.

19 Claims, 14 Drawing Sheets

U.S. PATENT DOCUMENTS

| | | | | |
|---|---|---|---|---|
| 2007/0055362 | A1* | 3/2007 | Brown et al. | 623/1.35 |
| 2007/0179941 | A1* | 8/2007 | Huang et al. | 707/4 |
| 2008/0195578 | A1 | 8/2008 | Hueske et al. | |
| 2010/0030758 | A1* | 2/2010 | Belknap et al. | 707/4 |

OTHER PUBLICATIONS

Semantic Query Optimization and Rule Graph, Robinson et al., Proceedings of the 5th KRDB Workshop Seattle, May 31, 1998.*

Unit-testing Query transformation Rules, Elhemali et al., DBTest, Jun. 13, 2008.*

A framework for Testing Query transformation Rules, Elmongui et al., SIGMOD, Jul. 2, pp. 257-268, 2009.*

A Rule-Based View of Query Optimization, Freytag, ACM, pp. 173-180, 1987.*

Rule Condition Testing and Action Execution in Ariel, Hanson, ACM SIGMOD, pp. 49-58, 1992.*

Query Graph Model for SPARQL, Heese, ER Workshops, LNCS 4231, pp. 445-454, 2006.*

Rule-Based Multi-Query Optimization, Hong et al, EDBT, 2009.*

Extending Query Rewriting Techniques for Fine-Grained Access Control, Rizvi et al, SIGMOD Jun. 13-18, 2004.*

A Fast Transformation Method for Semantic Query Optimization, Sayli et al. IEEE, pp. 319-326. 1997.*

Learning Transformation Rules for Semantic Query Optimization: A Data-Driven Approach, Shekhar, Computer Science Dept, University of Minesota, Minneapolis, MN.*

A Method for Automatic Rule Derivation to Support Semantic Query Optimization, Siegel et al, ACM transactions on Database Systems, 17(4), pp. 563-600, 1992.*

Liu, et al., "A Language and Framework for Invariant-Driven Transformations", Retrieved at << http://www.cs.sunysb.edu/~stoller/papers/gpce-2009.pdf >>, Generative Programming and Component Engineering, Proceedings of the eighth international conference on Generative programming and component engineering, Oct. 4-5, 2009, pp. 10.

Robinson, et al., "Semantic Query Optimisation and Rule Graphs", Retrieved at << http://cswww.sx.ac.uk/staff/lowden/KRDB%2798.pdf >>, Proceedings of the 5th INternational Workshop on Knowledge Represenation Meets Databases (KRDB '98), Innovative Application Programming and Query Interfaces, May 31, 1998, pp. 1-14.

Ioannidis, Yannis E., "Query Optimization", Retrieved at << http://cgi.di.uoa.gr/~pms515/query-opt-ioan.pdf >>, ACM Computing Surveys (CSUR), vol. 28, No. 1, Mar. 1996, pp. 1-38.

Das, et al., "Prairie: A Rule Specification Framework for Query Optimizers", Retrieved at << http://citeseerx.ist.psu.edu/viewdoc/download?doi=10.1.1.38.3248&rep=rep1&type=pdf>>, Technical Report, TR 94-16, 1994, pp. 1-25.

Shekhar, et al., "Learning Transformation Rules for Semantic Query Optimization: A Data-Driven Approach", Retrieved at << http://www.spatial.cs.umn.edu/paper_ps/tkde94.discovery.ps >>, IEEE Transactions on Knowledge and Data Engineering, vol. 5, No. 6, Dec. 1993, pp. 1-31.

Albert, Joseph., "Algebraic Properties of Bag Data Types", Retrieved at << http://citeseerx.ist.psu.edu/viewdoc/download?doi=10.1.1.97.7657&rep=rep1&type=pdf >>, Very Large Data Bases, Proceedings of the 17th International Conference on Very Large Data Bases, Sep. 3-6, 1991, pp. 211-219.

Agrawal, et al., "Database Tuning Advisor for Microsoft SQL Server 2005", Retrieved at << http://www.cs.toronto.edu/vldb04/protected/eProceedings/contents/pdf/IND4P3.PDF >>, In VLDB, Very Large Data Bases Endowment, Aug. 2004, pp. 1110-1121.

Ahmed, et al., "Cost-Based Query Transformation in Oracle", Retrieved at << http://yjan.tistory.com/attachment/490e5f1999d96E6.pdf >>, Very Large Data Bases, Proceedings of the 32nd international conference on Very large data bases, Sep. 12-15, 2006, pp. 1026-1036.

Celis, Pedro., "The Query Optimizer in Tandem's new ServerWare SQL Product", Retrieved at << http://www.sigmod.org/vldb/conf/1996/P592.PDF >>, Very Large Data Bases, Proceedings of the 22th International Conference on Very Large Data Bases, Sep. 3-6, 1996, pp. 592.

Chaudhuri, Surajit., "An Overview of Query Optimization in Relational Systems", Retrieved at << http://www.csd.uoc.gr/~hy460/pdf/chaudhuri.pdf >>, Symposium on Principles of Database Systems, Proceedings of the seventeenth ACM SIGACT-SIGMOD-SIGART symposium on Principles of database systems, Jun. 1-4, 1998, pp. 11.

Chaudhuri, et al., "Automating Statistic Management for Query Optimizers", Retrieved at << http://research.microsoft.com/pubs/76766/stats.pdf >>, IEEE Transactions on Knowledge and Data Engineering, vol. 13, No. 1, Jan. 2001, pp. 10.

Chaudhuri, et al., "Including Group-By in Query Optimization", Retrieved at << http://citeseerx.ist.psu.edu/viewdoc/download?doi=10.1.191.5989&rep=rep1&type=pdf >>, Very Large Data Bases, Proceedings of the 20th International Conference on Very Large Data Bases, Sep. 12-15, 1994, pp. 354-366.

Dayal, Umeshwar., "Of Nests and Trees—A Untied Approach to Processing Queries that contain Subqueries, Aggregates and Quantifiers", Retrieved at << http://www.vldb.org/conf/1987/P197.PDF >>, Proceedings of the 13th Very Large Data Bases Conference, VLDB, 1987, pp. 197-208.

Galindo-Legaria, et al., "How to Extend a Conventional Opitmizer to Handle One and Two-Sided Outerjoin", Retrieved at << http://ieeexplore.ieee.org/stamp/stamp.jsp?arnumber=00213169 >>, Proceedings of the Eighth International Conference on Data Engineering, Feb. 3-7, 1992, pp. 402-409.

Giakoumakis, et al., "Testing SQL Server's Query Optimizer: Challenges, Techniques and Experiences", Retrieved at << ftp://ftp.research.microsoft.com/pub/debull/A08mar/giakoumakis.pdf >>, IEEE Bulletin of the Technical Committee on Data Engineering, Mar. 2008, pp. 1-8.

Graefe, Goetz., "The Cascades Framework for Query Optimization", Retrieved at << http://citeseerx.ist.psu.edu/viewdoc/download?doi=10.1.1.98.9460&rep=rep1&type=pdf >>, IEEE Data Eng. Bulletin, vol. 18, No. 3, 1995, pp. 19-28.

Graefe, et al., "The Volcano Optimizer Generator-Extensibility and Efficient Search", Retrieved at << http://citeseerx.ist.psu.edu/viewdoc/download?doi=10.1.1.21.2197&rep=rep1&type=pdf >>, Proceedings of the Ninth International Conference on Data Engineering, Apr. 19-23, 1993, pp. 20.

D, et al., "On the Production of Anorexic Plan Diagrams", Retrieved at << http://www.vldb2007.org/program/slides/s1081-d.pdf >>, Very Large Data Bases, Proceedings of the 33rd international conference on Very large data bases, Sep. 23-27, 2007, pp. 1-46.

Ilyas, et al., "Estimating Compilation Time of a Query Optimizer", Retrieved at << http://www.cs.uwaterloo.ca/~ilyas/papers/MOPT.pdf >>, International Conference on Management of Data, Proceedings of the 2003 ACM SIGMOD international conference on Management of data, Jun. 9-12, 2003, pp. 12.

Ioannidis, et al., "Left-Deep Vs. Bushy Trees—An Analysis of strategy Spaces and its Implications for Query Optimization", Retrieved at << http://www.csd.uoc.gr/~hy460/pdf/Left-deep_vs_bushy_trees.pdf >>, International Conference on Management of Data, Proceedings of the 1991 ACM SIGMOD international conference on Management of data, May 29-31, 1991, pp. 168-177.

Kim, Won., "On Optimizing an SQL-like Nested Query", Retrieved at << http://www.inf.uni-konstanz.de/dbis/teaching/ws0607/arch-dbms/Kim1982-UnnestingSQL.pdf >>, ACM Transactions on Database Systems (TODS), vol. 7, No. 3, Sep. 1982, pp. 443-469.

Mackert, et al., "R* Optimizer Validation and Performance Evaluation for local queries", Retrieved at << http://pages.cs.wisc.edu/~chenl/qualify/Distributed_And_Parallel_DB/R_optimizer.pdf >>, International Conference on Management of Data, Proceedings of the 1986 ACM SIGMOD international conference on Management of data, May 28-30, 1986, pp. 84-95.

Muralikrishna, M., "Improved Unnesting Algorithms for Join Aggregates SQL Queries", Retrieved at <<http://citeseerx.ist.psu.edu/viewdoc/download?doi=10.1.1.115.5921&rep=rep1&type=pdf >>, Very Large Data Bases, Proceedings of the 18th International Conference on Very Large Data Bases, Aug. 23-27, 1992, pp. 91-102.

Pirahesh, et al., "Extensible/Rule Based Query Rewrite Optimization in Starburst", Retrieved at << http://citeseerx.ist.psu.edu/viewdoc/download?doi=10.1.1.40.7950&rep=rep1&type=pdf >>, International Conference on Management of Data, Proceedings of the 1992 ACM SIGMOD international conference on Management of data, Jun. 2-5, 1992, pp. 10.

Poess, et al., "Why You Should Run TPC-DS: A Workload Analysis", Retrieved at << http://www.tpc.org/tpcds/tpcds_workload_analysis.pdf >>, Very Large Data Bases, Proceedings of the 33rd international conference on Very large data bases, Sep. 23-28, 2007, pp. 1138-1149.

Reddy, et al., "Analyzing Plan Diagrams of Database Query Optimizers", Retrieved at << http://deliver.acm.org/10.1145/1090000/1083735/p1228-reddy.pdf?key1=1083735&key2=8793550721&coll=GUIDE&dl=GUIDE&CFID=83082739&CFTOKEN=87599864 >>, Very Large Data Bases, Proceedings of the 31st international conference on Very large data bases, Aug. 30-Sep. 2, 2005, pp. 1228-1239.

Seshadri, et al., "Complex Query Decorrelation", Reterieved at << http://ieeexplore.ieee.org/stamp/stamp.jsp?tp=&arnumber=492194 >>, ICDE, Proceedings of the Twelfth International Conference on Data Engineering, Feb. 26-Mar. 1, 1996, pp. 450-458.

Stillger, et al., "Testing the Quality of a Query Optimizer", Retrieved at << http://citeseerx.ist.psu.edu/viewdoc/download?doi=10.1.1.16.4708&rep=rep1&type=pdf >>, Data Engineering Bulletin, vol. 18, 1994, pp. 1-9.

Yan, et al., "Eager Aggregation and Lazy Aggregation", Retrieved at << http://citeseerx.ist.psu.edu/viewdoc/download?doi=10.1.1.63.6449&rep=rep1&type=pdf >>, Very Large Data Bases, Proceedings of the 21th International Conference on Very Large Data Bases, Sep. 11-15, 1995, pp. 345-357.

"TPC-H Benckmark", Retrieved at << http://www.tpc.org >>, Retrieved Date: Apr. 6, 2010, p. 1.

* cited by examiner

TRANSFORMATION RULE PROFILING FOR A QUERY OPTIMIZER

BACKGROUND

Query optimizers in database management systems (DBMSs) can obtain an efficient execution plan for a given query. Many query optimizers use a transformation rule-based framework. Such query optimizers use transformation rules to generate different alternative plans for a query. Research has been done on identifying a set of transformation rules to be used by query optimizers, and the set of transformation rules has grown significantly over time. There has also been work centered on adding additional types of transformation rules to query optimizers. Some of the important classes of transformation rules include rules for pulling-up or pushing down a group-by operator, handling nested sub-queries, and commuting outer joins with joins.

There are at least two main kinds of transformation rules. Logical transformation rules transform logical operator trees into equivalent logical operator trees. Some examples of logical transformation rules include join commutativity and pushing group-by operators below join operators. On the other hand, implementation rules or physical transformation rules can transform logical operator trees into hybrid logical/physical trees. Example implementation rules include rules that transform a logical join operator into a hash join implementation. Some extensible optimizers also leverage the idea of transformation rules during the query rewrite phase to generate alternative logical representations of the input query.

Transformation rule-based query optimizers may use a top-down approach to query optimization. The query optimizer can be initialized with a logical tree of relational operators corresponding to an input database query. The query optimizer can transform the input logical tree into an efficient implementation operator tree to implement the query. For this purpose, transformation rules can be used to generate different alternative plans for executing a query. The set of transformation rules that may be available to the query optimizer can determine the search space of plans considered by the optimizer, and thus the set of rules can determine the quality and/or efficiency of the final plan.

SUMMARY

This summary is provided to introduce a selection of concepts in a simplified form that are further described below in the detailed description. This summary is not intended to identify key features or optimized features of the claimed subject matter, nor is it intended to be used to limit the scope of the claimed subject matter. While certain disadvantages of prior technologies are noted above, the claimed subject matter is not to be limited to implementations that solve any or all of the noted disadvantages of the prior technologies.

Various embodiments are described for transformation rule profiling for a query optimizer. The method can include the operation of obtaining a database query configured to be optimized by the query optimizer of a database system. An optimized query plan for the database query can be found using a host set of transformation rules. Individual transformation rules can be removed from a query plan generation process. One transformation rule can be removed and checked at a time. Each transformation rule can be checked to determine whether the transformation rule affects an optimal query plan output. A test query plan can be generated after each transformation rule has been removed. The query optimizer can determine whether the test query plan is different than the optimized query plan in the absence of the removed transformation rule. An equivalent set of transformation rules can be created that includes transformation rules where the test query plan generated from the equivalent set of transformation rules is equivalent to the optimized plan.

In another example embodiment, the technology can include a system for transformation rule profiling for search queries. The system can include a database server having a database management system (DBMS), memory 304, and at least one processor. A plurality of database queries can be stored or queued up for use by the database management system. A host set of transformation rules can be accessible to the database management system, and the host set of transformation rules can include a plurality of transformation rules. A query optimizer can use the plurality of transformation rules to optimize the database queries. A relevance rule module can create an equivalent set of transformation rules that includes transformation rules where the transformation rules are used to find an optimized plan for a data query.

DETAILED DESCRIPTION

Figure 1:
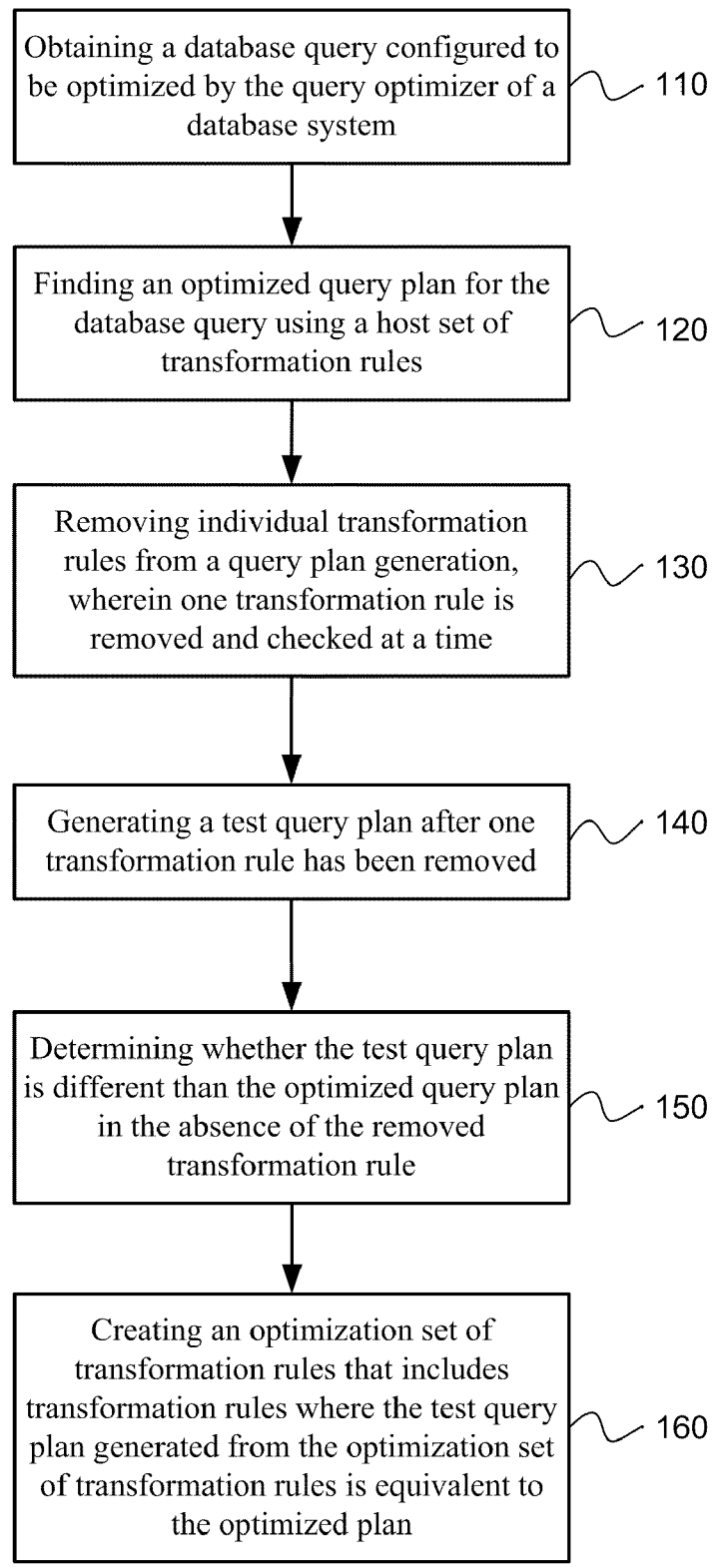
FIG. 1 is a flow chart illustrating an embodiment of a method of transformation rule profiling for a query optimizer.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

In spite of the fact that rule-based optimization has been extensively studied, there has been little work on empirically evaluating the effectiveness of query transformation rules. Specifically, the ability to profile a query optimizer's usage of transformation rules has not previously been studied in detail. Such transformation rule profiling is useful because modern optimizers rely on a large number (typically hundreds) of transformation rules and the transformation rules directly impact the quality and performance of a query optimizer. As the number of optimizer rules has increased, there is a concern that the plan choices of the optimizer may change unpredictably (e.g., even with small changes to rule selectivity). In fact, a study of plan diagrams can demonstrate that the plan choices of existing optimizers may be too fine grained.

The present technology can profile the effectiveness of transformation rules in a query optimizer for a variety of benchmarks and queries. Profiling can also be defined in the context of transformation rules. In the case of a single query, profiling can mean identifying the transformation rules used to obtain the optimal plan or an optimizing plan for the query. This set of transformation rules can be referred to as an equivalent set of rules for a particular query. In some cases, there may be more than one viable equivalent set of rules for a query.

As a result, a relevant transformation rule may also be defined. A transformation rule is relevant for a query if the transformation rule is part of every equivalent set of rules for that query. In other words, the optimal plan or optimizing plan for a query may be missed unless the relevant transformation rules for a query are considered. The relevant transformation rule definitions can also be extended from a query to a workload of queries (e.g., a defined set of queries).

These metrics can be empirically studied for a variety of workloads. The equivalent set sizes for most queries can be typically small at around 10% of the entire set of transformation rules. In addition, just a small number of rules may be relevant across many queries in a workload. These results have implications for optimizer design and testing, as discussed later.

The search space of a query optimizer can be determined in large part by the set of transformation rules used by the query optimizer on the database queries. If the set of transformation rules that the optimizer can use is constrained, the query optimizer may potentially reduce the search space and reduce the optimization time significantly as a result. The optimizing rule set sizes for queries can typically be small. If a priori knowledge of the equivalent set information of a query is available, then significant reductions in optimization time can be obtained without affecting the plan choice of the query optimizer. Using just the equivalent set of transformation rules for optimization can be particularly useful for queries or stored procedures where the optimization time overheads are significant. By leveraging the knowledge of relevant rules for a workload, there may be an opportunity to potentially reduce the complexity of plan diagrams (and hence improve stability of plans).

In the following discussion, certain notations may be used. The set of transformation rules for the query optimizer can be represented by $R=\{r_1, \ldots r_n\}$. For an execution plan and cost, using a given query q, Plan(q) and Cost(q) to refer to the execution plan chosen by the query optimizer and the query optimizer's cost respectively.

Let $S \subseteq R$ be a set of rules. The execution plan and cost of a query q when only the rules in S are enabled (i.e. the remaining rules in R-S are turned off) can be denoted by Plan(q, S) and Cost(q, S) respectively.

Many query optimizers have the ability to optimize a query when a subset of transformation rules is turned off. The technology described below can be performed in any database system that supports transformation rule activation and deactivation functionality. Alternatively, the desired set of transformation rules can be loaded and/or unloaded for a database system that does not support activation and deactivation of transformation rules.

An equivalent set of rules for a query will now be discussed. The search space of a query optimizer can be determined by the set of transformation rules used by the search query, as explained previously. Different transformation rules may influence the plan choice of a particular query. In particular, the set of rules sufficient to obtain the optimal plan for a given query can be identified and referred to as an optimized set of rules for a particular query.

FIG. 1 illustrates an embodiment of a method for transformation rule profiling for a query optimizer. The method can include the operation of obtaining a database query configured to be optimized by the query optimizer of a database system, as in block 110. A query is typically optimized by finding a query plan for retrieving desired data from the database system as efficiently as possible. An optimized query plan for the database query can be found using a host set of transformation rules, as in block 120. The host set of transformation rules may include the entire set of transformation rules used by the query optimizer.

Individual transformation rules can be removed from a query plan generation process, as in block 130. One transformation rule is removed and checked at a time. Each transformation rule can be checked to determine whether the transformation rule affects an optimal query plan output. A test query plan can be generated after each transformation rule has been removed, as in block 140. The query optimizer can determine whether the test query plan is different than the optimized query plan in the absence of the removed transformation rule, as in block 150.

An equivalent set of transformation rules can be created that includes transformation rules where the test query plan generated from the equivalent set of transformation rules is equivalent to the optimized plan, as in block 160. Individual transformation rules can be disabled in the host rule set for each individual rule that is tested and removed because the transformation rule does not affect an optimized query plan. In other words, the transformation rules that may be disabled include each transformation rule that does not cause the test query plan to change as compared to the optimized query plan (e.g., optimal query plan), and such transformation rules can also be removed from the optimization rule set. The search results from the database system can be obtained for the optimized query plan, and the search results can be displayed to an end user.

Definition. Optimized set of rules for a query. Given a query q, an optimized set of rules for query is a subset E of R such that Plan(Q, E)=Plan(Q, R) and this property is not true for any proper subset of E.

Table 1 outlines a more detailed method for computing the subset of optimizing rules that were used for obtaining the optimized query plan or optimal query plan. A greedy algorithm similar to the Shrinking-Set method can be used for computing an equivalent set of statistics to build for a query workload. The method starts with the complete host set of rules R. The host set of rules includes every transformation rule used by the query optimizer. Each rule is removed from the host set of rules and considered in turn. If the absence of the one rule does not cause the optimal plan to change for the query, the rule is considered "non-optimizing" and the rule can be dropped. The running time of the method is linear in the size of R. In general, multiple optimized sets are possible.

TABLE 1

Equivalent Set of Rules for a Query

1. $\mathcal{R}$ = Set of Rules in Optimizer
2. E = $\mathcal{R}$
3. For each r ∈ $\mathcal{R}$ Do
4.    If Plan (Q, E − {r}) = Plan (Q, E)
5.       E = E − {r}
6. Return E FIGS. 2-6 plot the sizes of the equivalent set of rules for the queries in the different example workloads considered now. The Y-axis in the graphs denotes the number of rules in the equivalent set. In an example implementation, the example workloads can be applied on a SQL Server as the database system and Windows Server™ as the operating system. The query workloads and datasets used for evaluation were the following.

Figure 2:
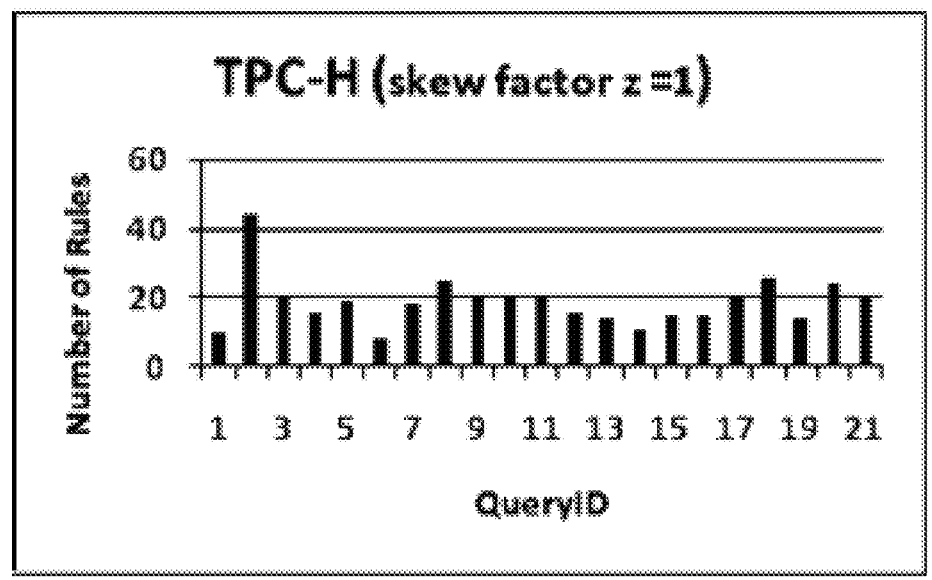
FIGS. 2-6 illustrate charts of the sizes of the equivalent set of rules for the queries in the different example workloads described.

FIG. 2 illustrates the size of the equivalent set of rules for a TPC-H-skewed database. The results for a TPC-H-uniform case that are similar to these results and are not shown. The TPC Benchmark™ H (TPC-H) from the Transaction Process Performance Council is a decision support benchmark database. The TPC-H database consists of a suite of business oriented ad-hoc queries and concurrent data modifications. The queries and the data populating the database have been chosen to have broad industry-wide relevance. This database can enable the examination of large volumes of data and execution of queries with a high degree of complexity.

Figure 3:
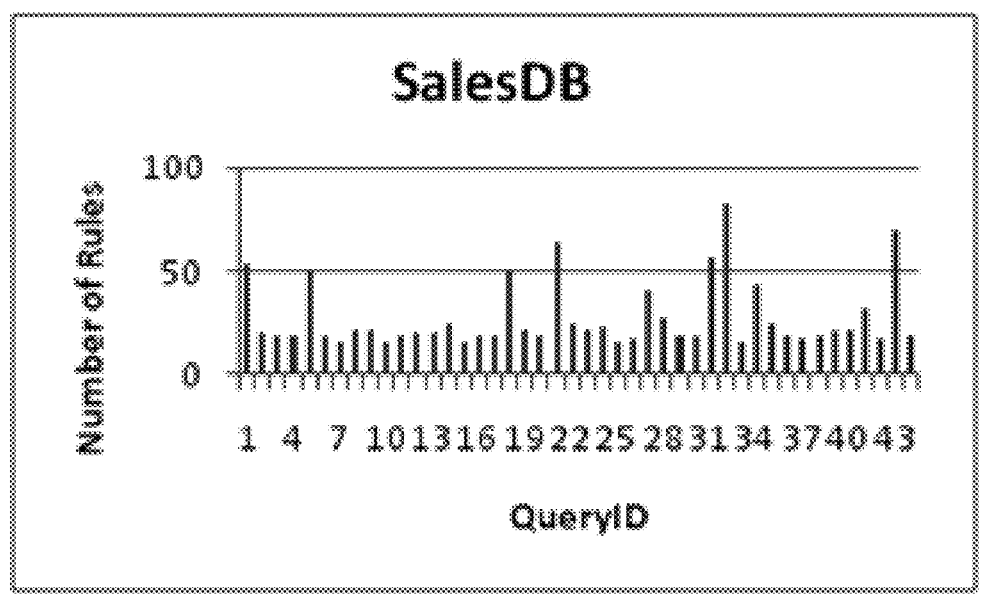

FIG. 3 illustrates the size of the equivalent set of rules for queries in an example sales database named SalesDB. A real world sales database (around 1 GB) can be used for generating this example. The example workload may be a set of 35 reporting queries which join 6-8 tables.

Figure 4:
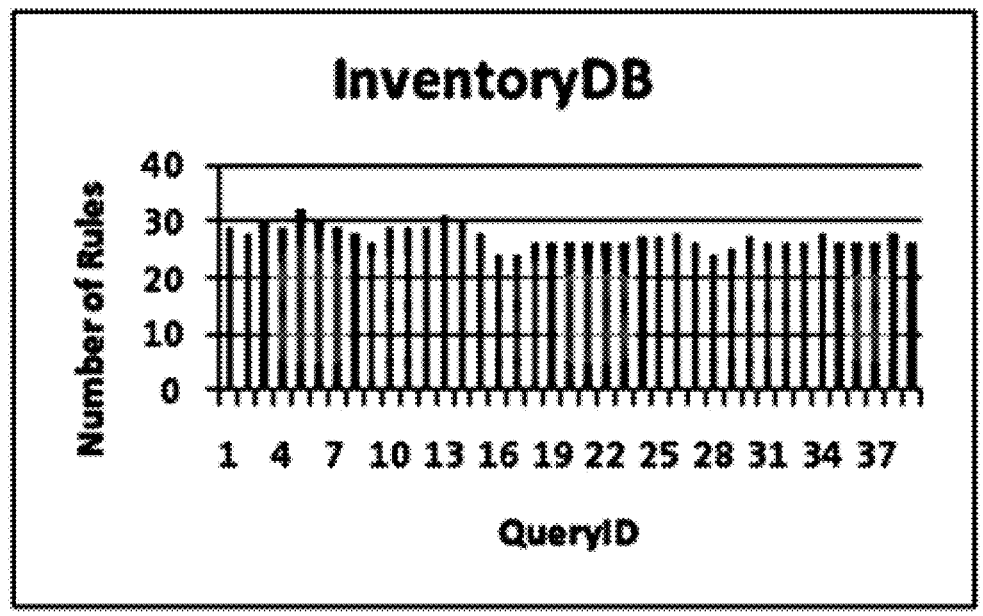

FIG. 4 illustrates the size of the equivalent set of rules for queries in an example inventory database named InventoryDB. A real world inventory database (around 15 GB) from an online retailer can be used. The example workload can be a set of 40 queries that are instances or variations of a single stored procedure which is a DSS style query that joins 8 tables and includes many aggregate functions.

Figure 5:
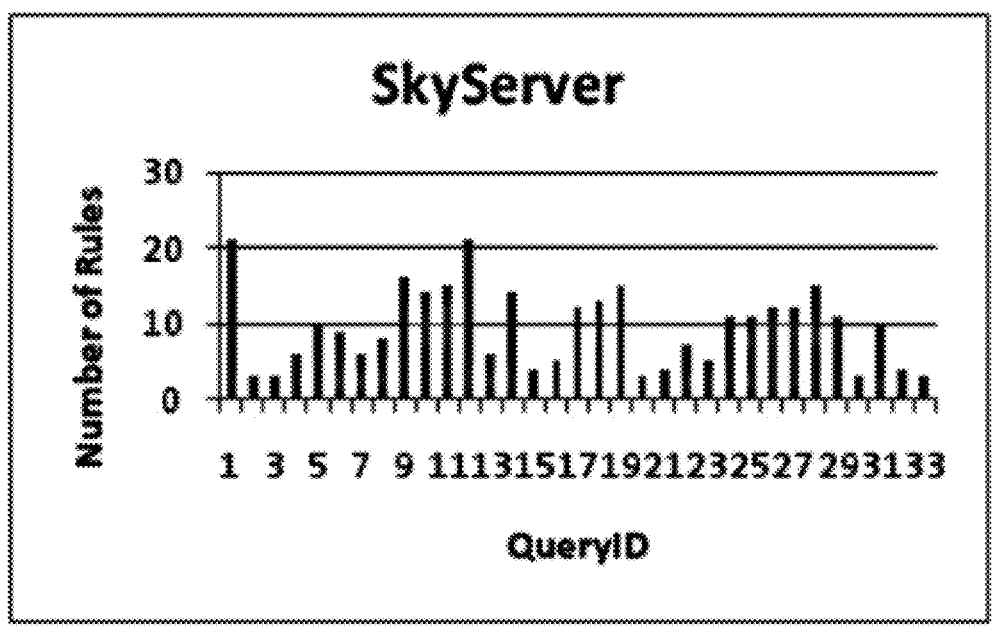

FIG. 5 illustrates the size of the equivalent set of rules for an example database named SkyServer which includes a large amount of astronomical information. The personal edition of the SkyServer database (around 500 MB) can be used along with a workload of 35 queries. These example queries typically contain a small number of joins but may make extensive use of user defined functions.

Figure 6:
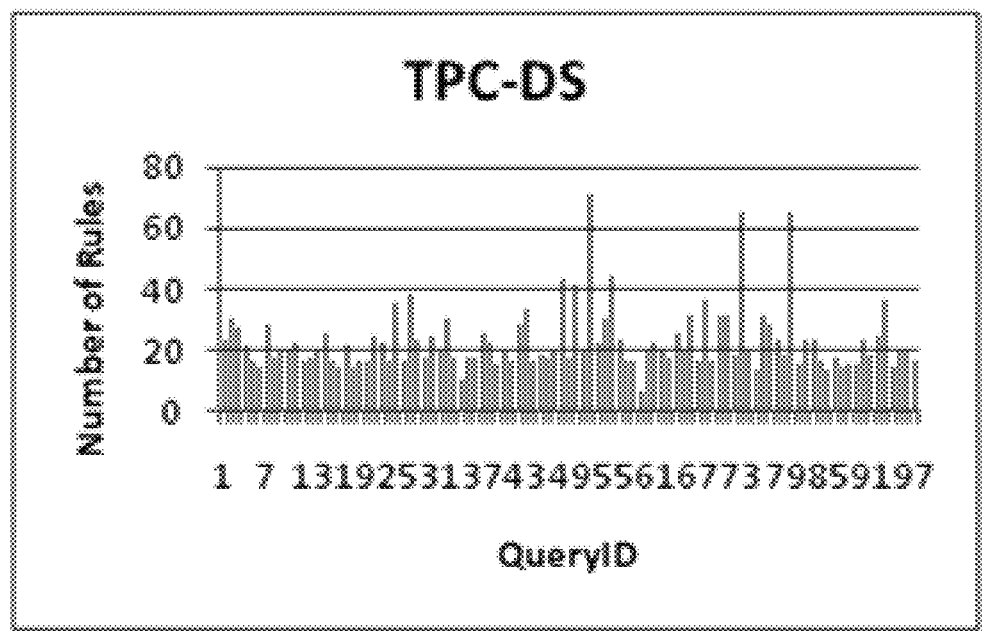

The example results indicate that for a majority of the queries around 30 rules (around 10% of an entire set of around 350+ rules) can be sufficient to obtain the optimized plan or optimal plan. Some few example queries may use a number of rules in the equivalent set that exceed 60 transformation rules. FIG. 6 illustrates TCP-DS results. The TCP-DS data from the Transaction Process Performance Council models a retail product supplier, including queries and data maintenance. The TCP-DS database management system included some of the more complex queries in a workload that joins 11 tables and in addition uses the SQL WITH clause to handle multiple references to a nested sub-query.

For a particular query, not all the rules in the host equivalent set may be syntactically relevant. For instance, transformation rules in a SQL server that can be related to a distributed query processing or XML processing may not be a part of an optimized set for any query in these workloads. Even accounting for this (the rules that are relevant for Select-Project-Join-Group By (SPJG) queries are still a large fraction), the fact that the optimized set sizes are this small can be leveraged to reduce the optimization time for queries.

In the discussion above, a method for determining which set of rules was sufficient to obtain the optimal plan for a particular query was analyzed. This analysis can be extended to a workload to understand how often a transformation rule impacts the choice of the optimal plan for a workload of queries. For instance, the information about transformation rules can be used to identify the more valuable or more useful rules for a workload of queries.

One way to profile rule relevance is to track how many alternative plans were generated during query optimization as a result of a particular rule firing. While a transformation rule may have produced an alternate plan, the transformation rule may not have impacted the final plan chosen by the query optimizer. For example, the alternate plan generated could be suboptimal and thus be pruned by the optimizer. A metric can be provided to identify the most relevant rules for a workload of queries. We define a rule to be relevant for a query as follows.

Definition: Relevant($r_i$, q): A rule $r_i$ can be defined to be relevant for a query q if Plan(q, {R}) !=Plan(q, {R−$r_i$}). In essence, a rule can be defined as relevant if optimizing the query with the rule turned off changes the plan chosen by the optimizer. Alternatively, a rule can be defined as relevant if optimizing the query with the transformation rule turned off does not significantly change the plan cost chosen by the query optimizer.

The relevance ratio for a rule $r_i$ and workload of queries W (denoted as RelevanceRatio($r_i$, W)) can be defined as the fraction of queries in W for which Relevant($r_i$, q) is true.

The definition of an equivalent set of rules for a query was defined previously. The relationship between the two metrics is as follows. Typically, the union of the relevant rules for a query should be identical to the query's equivalent set of transformation rules. However, this need not apply in some cases where the optimized set of rules for a query may not be unique. A few degenerate cases may exist where there are multiple equivalent sets for the same query. Further, a rule is relevant for a query if and only if the rule is contained in every equivalent set of rules for a query.

By way of example, the following analysis can be performed for the different workloads. The RelevanceRatio can be computed for each rule in R and for each workload the RelevanceRatio can be graphed in decreasing order for all rules that had non-zero RelevanceRatios.

Figure 7:
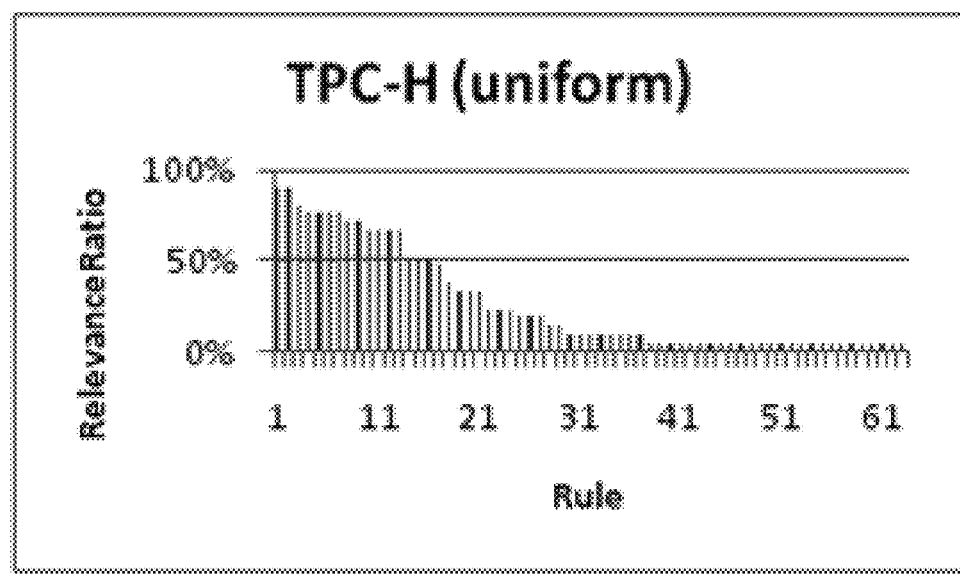
FIGS. 7-8 illustrate an example of results of query relevance for the TPC-H database.
Figure 8:
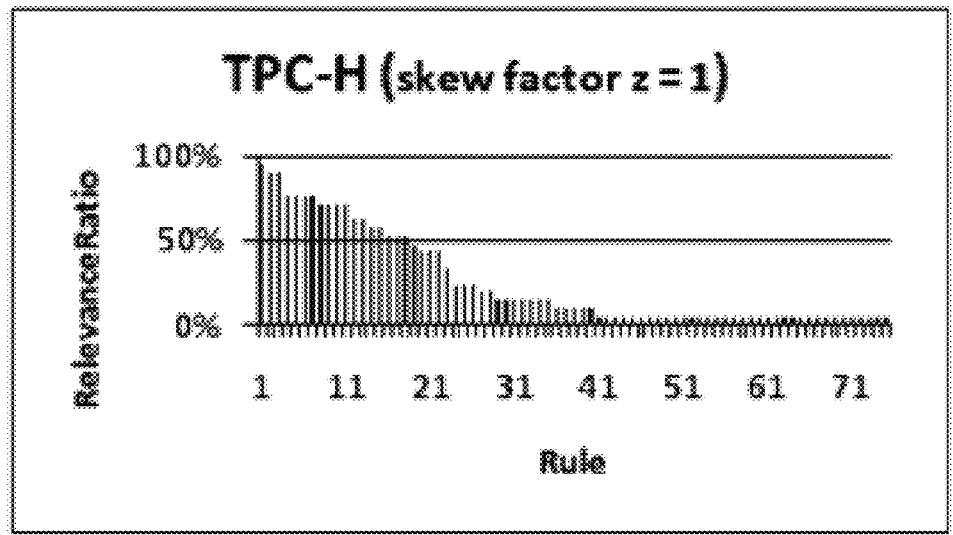
Figure 9:
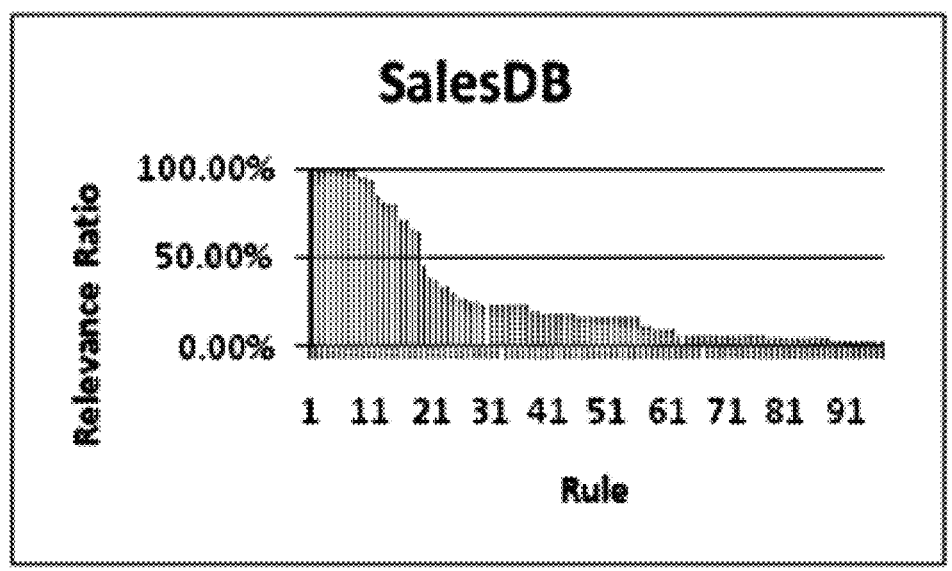
FIGS. 9-12 illustrate example relevant rule charts for several types of workloads.
Figure 10:
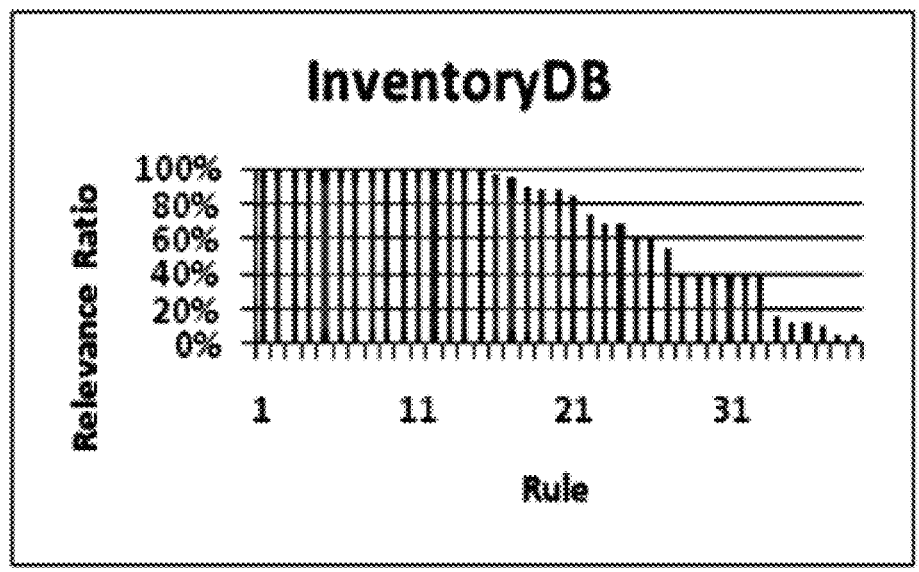
Figure 11:
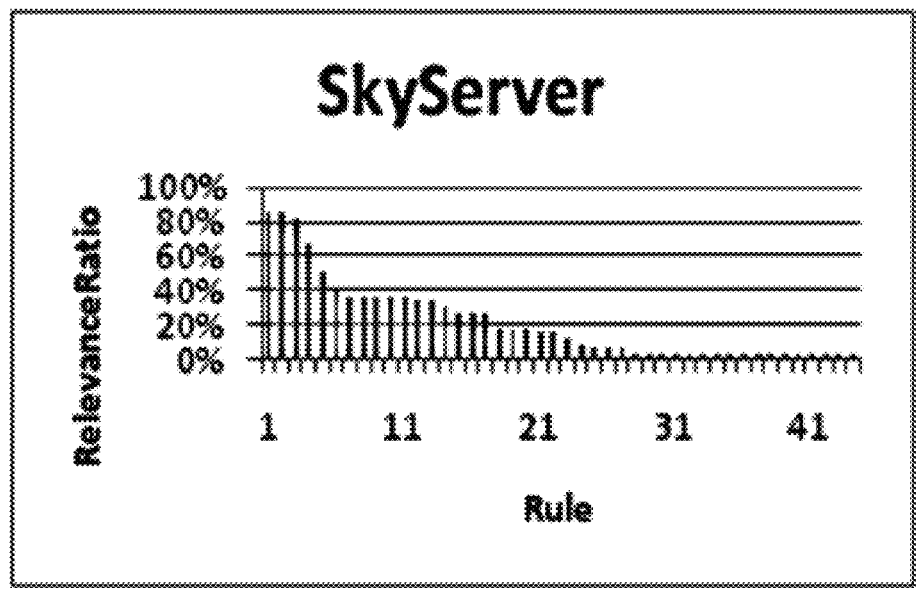
Figure 12:
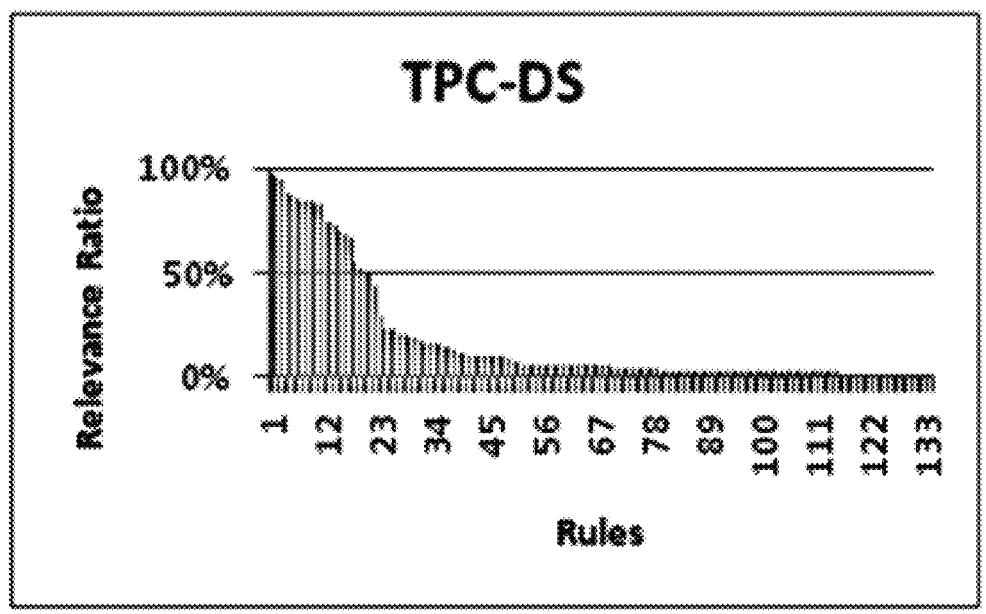

The results of query relevance for the TPC-H database can be shown in FIGS. 7 and 8. The total number of rules on the X axis indicates the number of distinct rules from R that were relevant for at least one query in the workload. As the graph shows, the number of distinct rules that may be relevant for at least one query is a fairly a small fraction of the entire set of rules. For example, for the TPC-H database 70 rules out of the entire set of around 350 rules can be relevant for at least one query. The graph also indicates the fact that the number of rules having a high RelevanceRatio is low. For instance, the number of rules that are relevant for 80% or more of the queries in TPC-H is less than 5.

Some of the most used rules for the TPC-H workload (having a relevance ratio of 50% or above), may include basic implementation methods such as sort-based methods for the OrderBy Operator and GroupBy operator, the hash join, sort merge methods for joins, and a few implementation rules related to indexes. The most used logical transformations can include rules for pushing down a selection over joins and the join commute rule and the rule for de-correlating a nested SELECT clause (e.g., for rewriting an EXISTS predicate to a join).

Some of the known transformation rules that had lower relevance ratios (relevant for less than 5% of queries) included rules for pulling up/pushing down a GroupBy operator and rules related to the outer join operator. For the skewed version of the TPC-H database, the frequently used set of rules is largely similar but for one notable exception, there may be an increased RelevanceRatio for rules pertaining to indexes. In addition, the skewed distribution (using a skew factor z=1) can increase the likelihood that some of the predicates are highly selective and thus make additional index rules more relevant (this is a "tuned" database that also had a larger number of indexes).

The relevant ratio plots for the other types of workloads are shown in FIGS. 9 to 12, and the results are largely similar with the exception of the InventoryDB database. The graph for the InventoryDB (FIG. 10) shows a larger number of rules having a high relevance ratio. For example, half of the relevant rules have a relevance ratio of nearly 100%. This is largely because the queries in the workload are instances of the same stored procedure, thus there is a high degree of similarity in the queries and the corresponding relevant rules.

A common pattern among the results is relatively few rules (less than 20 in most cases) with a high RelevanceRatio. This relevance ratio information can be used in the relationship between transformation rules and the complexity of plan diagrams generated by the optimizer, as will be discussed below.

Figure 13:
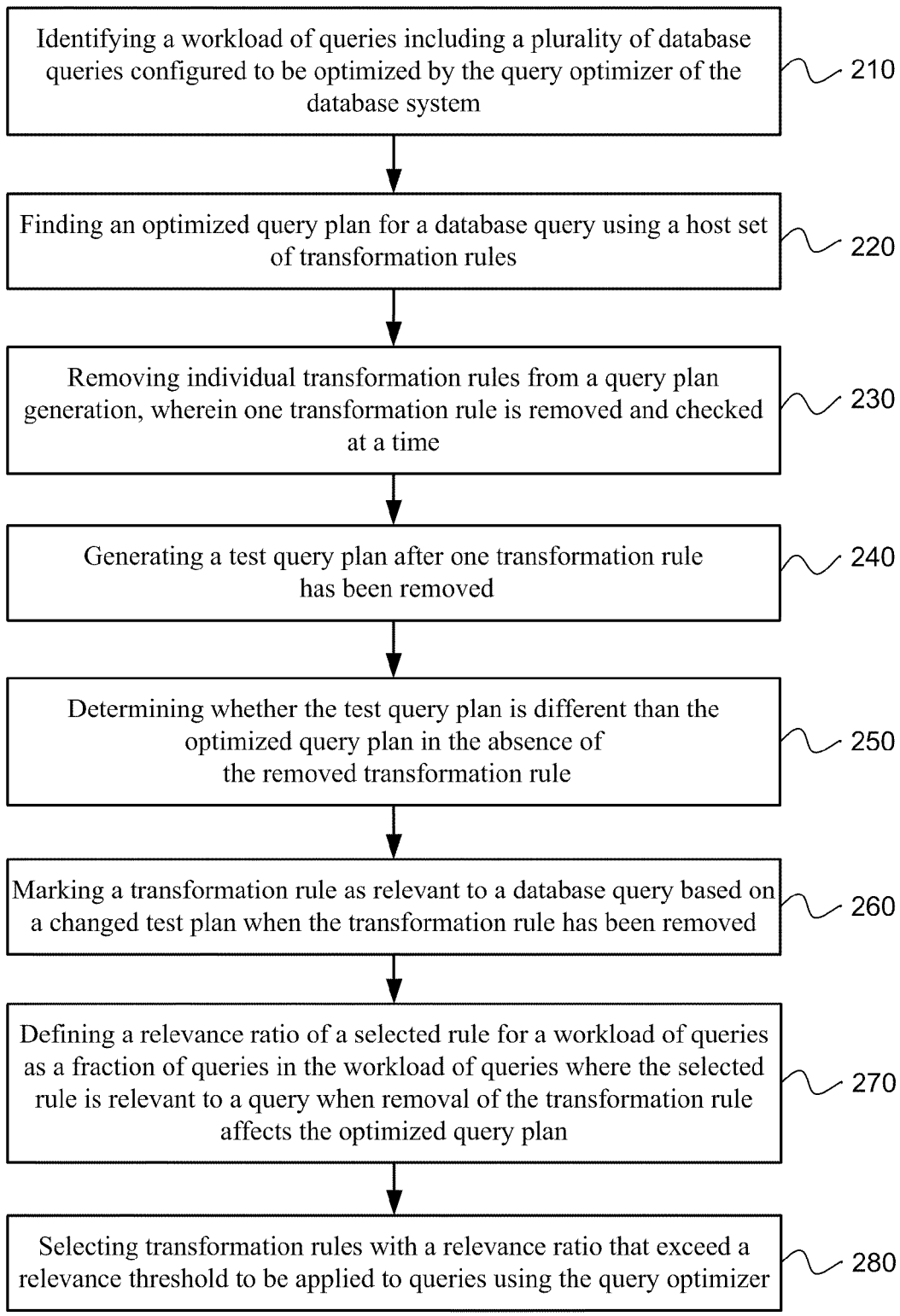
FIG. 13 is a flowchart illustrating an embodiment of a method for transformation rule profiling for a workload of queries.

FIG. 13 illustrates a summary of a method for transformation rule profiling for a query optimizer of a database system. The method can include the operation of identifying a workload of queries including a plurality of database queries configured to be optimized by the query optimizer of the database system, as in block 210. An optimized query plan can be found for a database query using a host set of transformation rules, as in block 220.

The individual transformation rules can be removed from a query plan generation, as in block 230. Specifically, one transformation rule is removed and checked at a time until each of the transformation rules has been checked. A test query plan can be generated after a transformation rule has been removed from the host set of transformation rules, as in block 240. The operation of determining whether the test query plan is identical to the optimized query plan in the absence of the removed transformation rule can be applied, as in block 250.

A transformation rule can be marked as relevant to a database query based on a changed test plan when the transformation rule has been removed, as in block 260. In other words, the transformation rule can be considered relevant if the optimized query plan changes when the transformation rule is removed from the transformation rule set.

Further, a relevance ratio of a selected rule for a workload of queries can be defined as a fraction of queries in the workload of queries for which the query is used, as in block 270. The selected rule can be relevant to a query when removal of the transformation rule affects the optimized query plan. Transformation rules with a relevance ratio that exceed a relevance threshold can be selected to be applied to queries using the query optimizer, as in block 280. This selection may mean that a smaller set of transformation rules can be defined that contains transformation rules that exceed the relevance threshold, and this smaller set of transformation rules can provide effective query plan optimization without significant query execution plan efficiency degradation.

In addition, the system can determine which transformation rules are useful for at least one database query. The rules in the query optimizer can then be turned off except the transformation rules with the relevance ratio exceeding the relevance threshold. If the relevance threshold is set so that a transformation rule is checked to see if the transformation rule is relevant to at least one database query, then any transformation rules that are not contributing to optimizing a workload of queries can be turned off.

In one embodiment, the relevance threshold can be set to select transformation rules relevant to greater than a predefined percentage of queries. For example, the relevance threshold can be set to select transformation rules relevant to less than 50% of the database queries. Alternatively, the relevance threshold can be set to select the highest N number of transformation rules. For example, the relevance threshold can be set to select 10 to 50 of the highest relevance ranked transformation rules.

Figure 14:
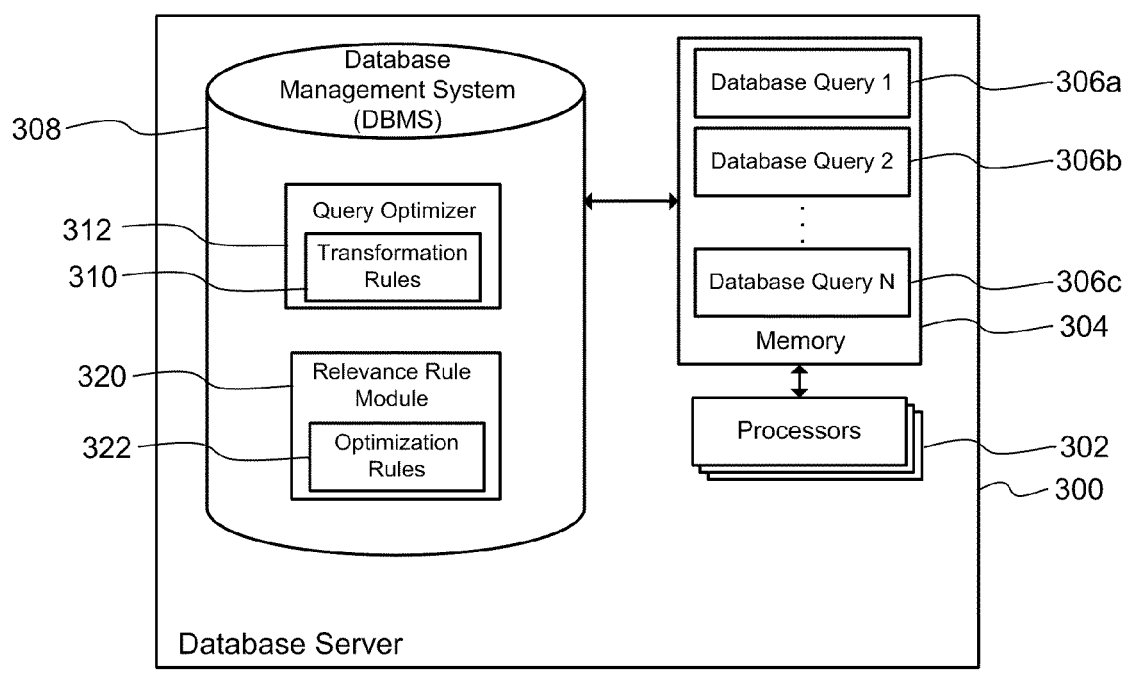
FIG. 14 illustrates an example embodiment of a system for transformation rule profiling for search queries.

FIG. 14 illustrates an example embodiment of a system for transformation rule profiling for search queries. The system can include a database server 300 having a database management system (DBMS) 308, a memory 304, and at least one processor 302 or processing core. A plurality of database queries 306a-c can be located in the memory for use by the database management system.

A host set of transformation rules 310 can be accessible to the database management system, and the host set of transformation rules can include a plurality of transformation rules. A query optimizer 312 can use the plurality of transformation rules to optimize the database queries. While FIG. 14 illustrates that the transformation rules reside in the query optimizer, the transformation rules can also be stored in another location accessible to the query optimizer. In addition, database queries can be stored in the memory in the database server or in another location accessible to the database management system (DBMS).

A relevance rule module 320 can create an equivalent set of transformation rules that includes transformation rules where the transformation rules are used to find an optimized plan for a data query. In other words, the equivalent set of transformation rules includes the minimum number of rules that are used to produce an optimized query plan. The relevance module can include methods for finding an optimized set of transformation rules as described above with Table 1 and FIG. 1. The method for finding the optimized set of transformation rules can be stored on a tangible computer readable medium such as a hard disk, optical recording media, flash RAM or another recording medium. The relevant rules module can also be used to determine which transformation rules may be used by at least one database query. In addition, the relevant rules module can be used to find transformation rules that may not be used for optimization because the transformation rules have errors.

The impact of rule relevance on plan diagram complexity will now be discussed. The total number of rules used by a query optimizer can define the search space of plans and thus directly contribute to the overall complexity of the query optimizer. Plan diagrams have been introduced as a way of visually explaining the complexity of the plan space of a query optimizer. The relationship between transformation rules and the complexity of plan diagrams for an optimizer can be useful.

Figure 15:
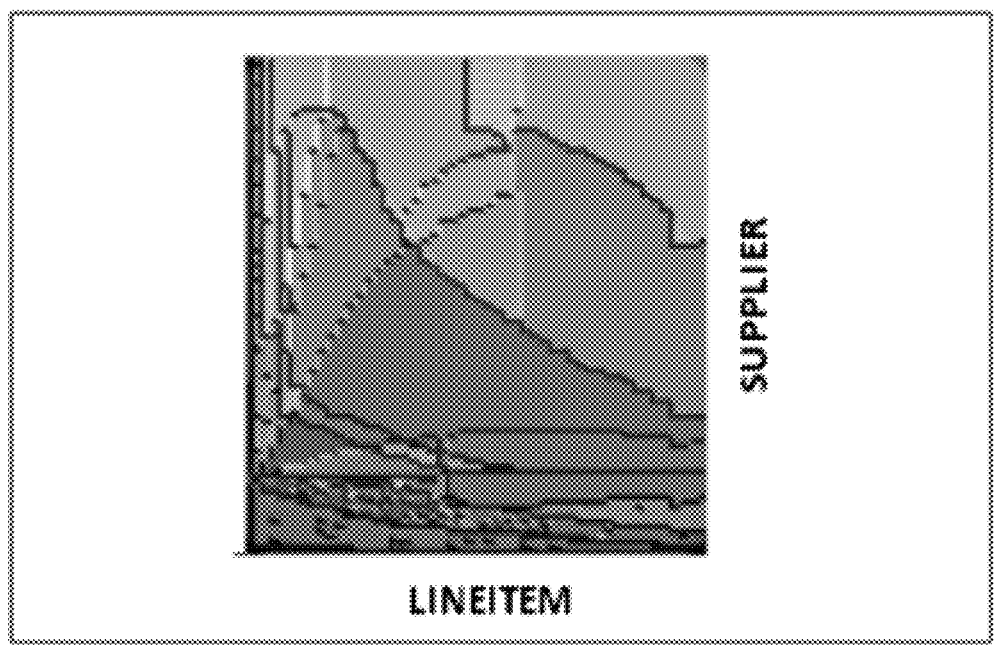
FIG. 15 illustrates an embodiment of a plan diagram for a query.
Figure 16:
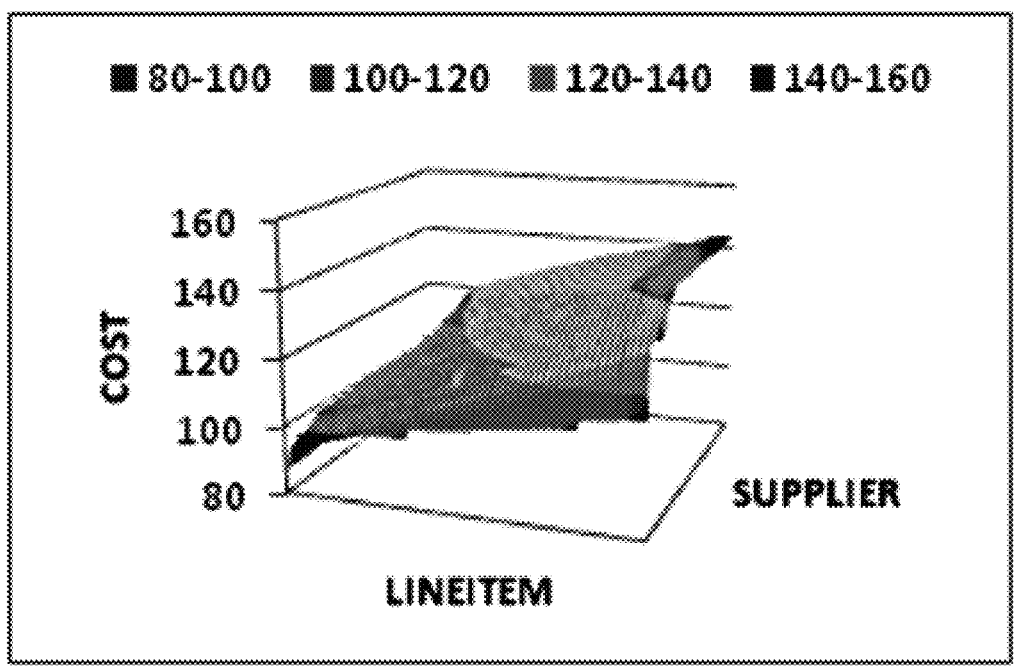
FIG. 16 illustrates an example cost diagram of the query optimizer estimated cost of plans over a selectivity space.

A plan diagram is a pictorial enumeration of the plan choices made by an optimizer over the selectivity space. FIG. 15 illustrates the plan diagram for TPC-H Query 8 (which is a query that joins 7 tables). The selectivity space for the line item and supplier tables can be varied which may enable choosing 100 different selectivity values for each table (for a total of 10,000 data points). There may be 54 distinct plans chosen by the optimizer in the entire space with some covering a very small fraction of the selectivity space. FIG. 16 illustrates the corresponding cost diagram, which plots the query optimizer estimated cost of these plans over the selectivity space.

After examining the plan diagrams of different queries, the plan diagrams illustrate that the query optimizer plan choices may be too fine grained. As a result, a reduced plan diagram can be computed in which the optimizer produces a simpler plan diagram that can be "close" enough in performance to the original. Plan diagram reduction has previously used the original plan diagram as the input to be optimized by a separate optimization module. However, the query optimizer can be simplified to directly generate reduced plan diagrams.

Figure 17:
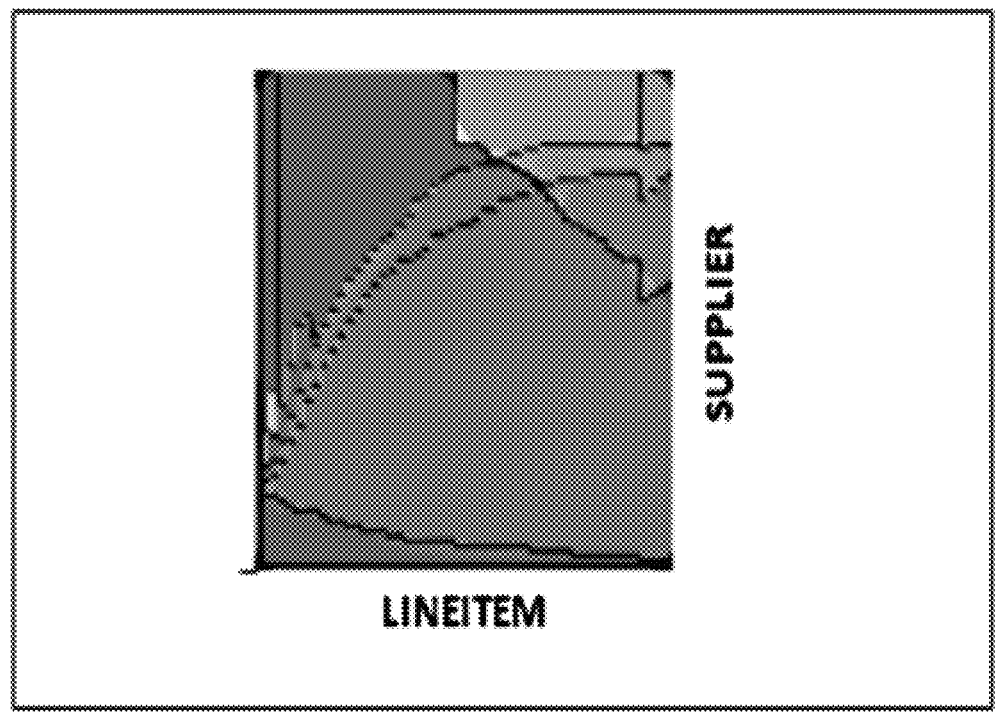
FIGS. 17-18 illustrate example plan diagrams and cost diagrams for a query.
Figure 18:
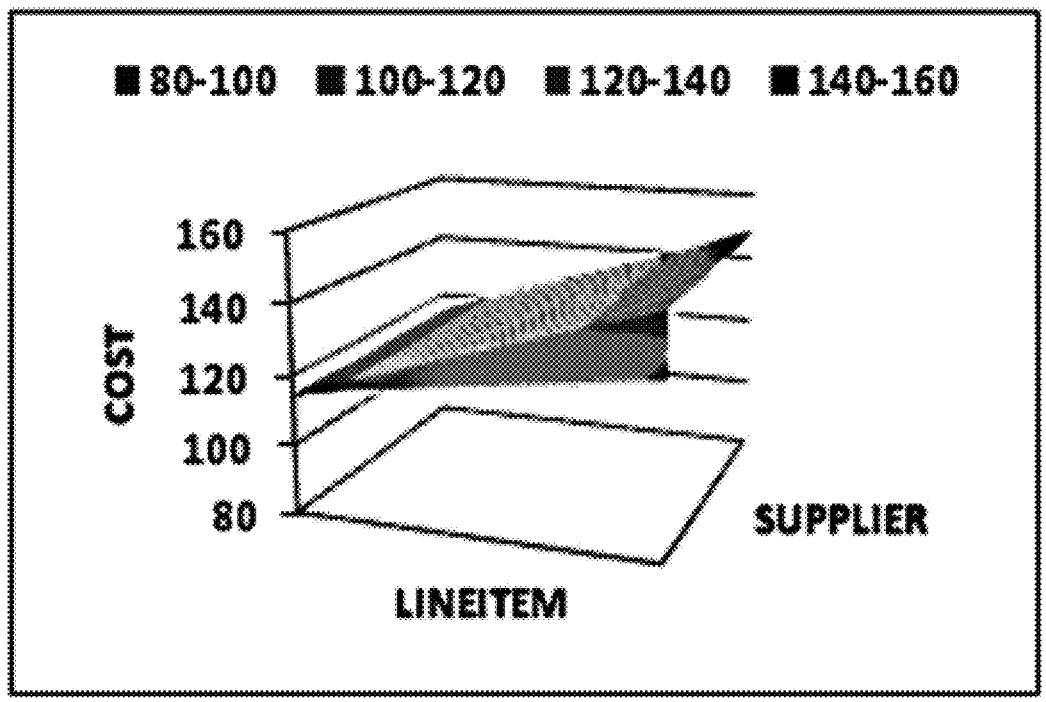

Since the set of the transformation rules used in a query optimizer directly influences the search space of plans considered by the optimizer, studying the relationship between the set of transformation rules used by the optimizer and the complexity of the resulting plan diagram is useful. In an example implementation, the 20 rules with the highest RelevanceRatio (see FIG. 7) for the entire TPC-H workload can be selected. Intuitively, these may be the 20 most "useful" transformation rules for the TPC-H workload, and these rules can include implementation methods for group-by, order-by, joins as well as logical transformation rules for commuting joins and de-correlating nested select queries. When the plan diagram for Query 8 is regenerated by turning off the other rules in the optimizer except the 20 identified rules, then the corresponding plan diagram and cost diagram are obtained as shown in FIG. 17 and FIG. 18. The number of distinct plans in FIG. 17 is 14 plans (in contrast to 54 in the original plan diagram) and the maximum cost degradation at other points in the selectivity space when the plan in the reduced diagram is compared to the corresponding plan in the original plan diagram may be 29.8% and the average degradation in cost (measured across the 10,000 data points) may be just 6.6%.

As this example illustrates, by carefully choosing the set of transformation rules to use, a much simpler plan diagram may be obtained without sacrificing the quality of the plan significantly. These examples point to the opportunity of potentially reducing the complexity of plan diagrams by leveraging the relevance information of the rules for a workload.

The impact of the described processes on optimization time can be described. The search space of a query optimizer may be largely determined by the set of transformation rules used by the query optimizer. If the set of rules that the optimizer can use is constrained, then the query optimizer can potentially reduce the search space and as a result, reduce the optimization time sharply. As explained previously, the useful set of transformation rules for a large fraction of the database queries can typically be small. This useful set of transformation rules can impact the time taken to optimize the query.

Figure 19:
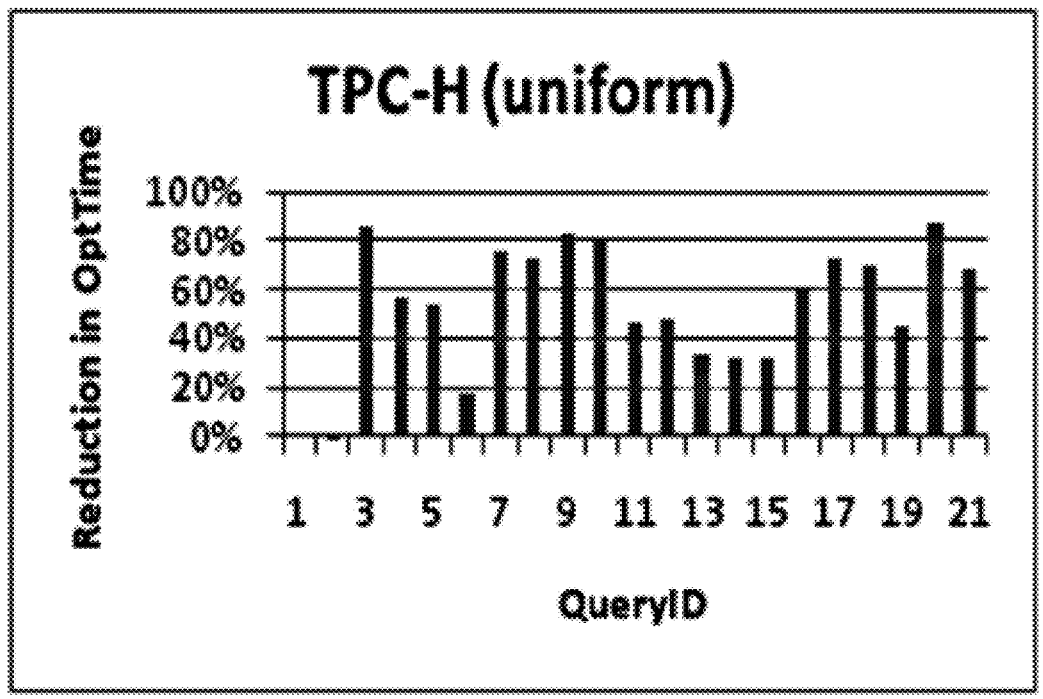
FIGS. 19-21 are charts illustrating examples of the reduction in optimization time for a workload using the equivalent set information for individual queries.
Figure 20:
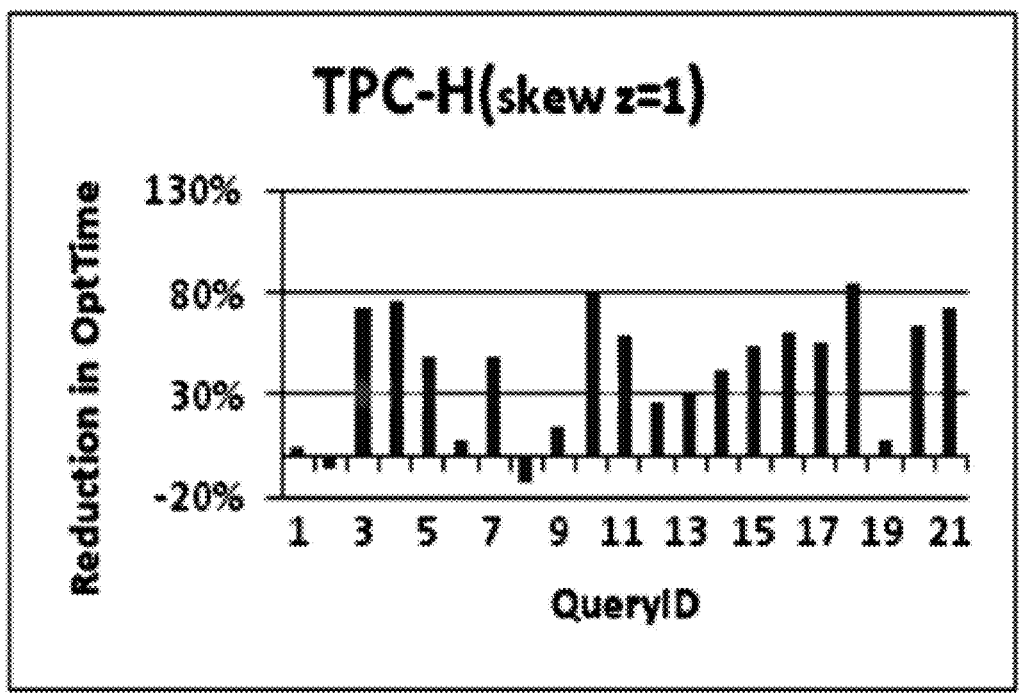
Figure 21:
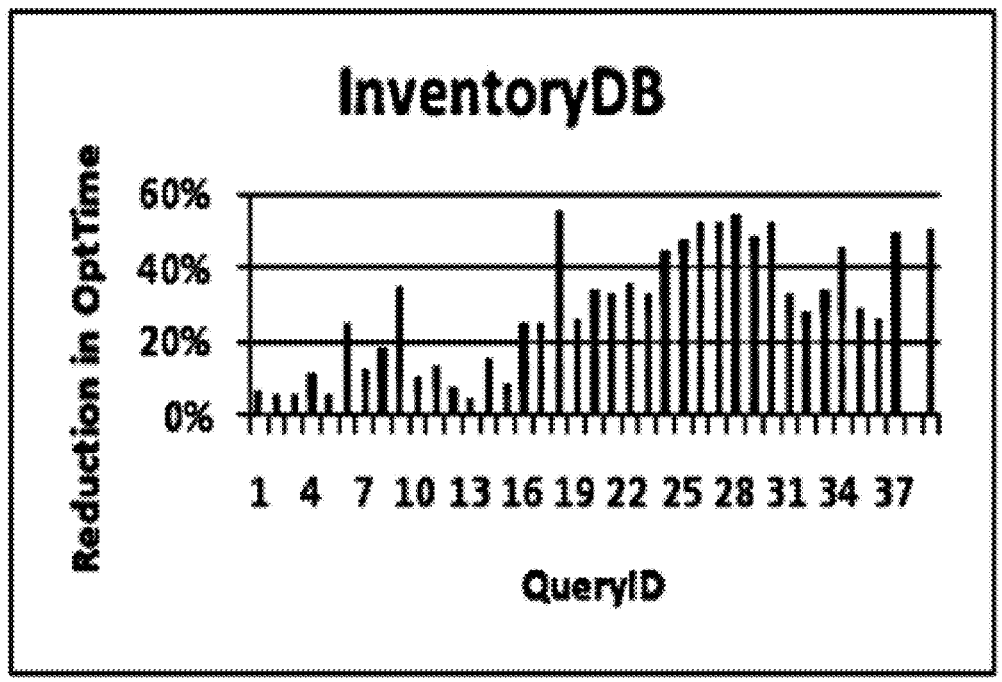

A query can be optimized by turning on the rules in the query's optimizing useful set and turning off the remaining rules. Note that this configuration may guarantee the same optimal plan. The reduction in optimization time for the workloads where the optimization time was significant is shown in FIGS. 19-21. However, the results for the workloads where the optimization times were negligible (e.g. the SkyServer database) are not shown. FIGS. 19-21 show the reduction in optimization times for the TPC-H databases and for the InventoryDB database.

These example results indicate that the optimization time savings can be substantial (e.g. 50% or more in several cases). This reduction in optimization time does not necessarily affect the quality of the plan. By including the equivalent set of rules for a query, the same optimal plan can be found. The results for the TPC-DS were largely similar but are not shown. Interestingly, there may be a few queries where the optimization times can be higher than the other workloads (10's of seconds) and the corresponding reduction in optimization time may also be much higher (around 90% reduction)

Since the useful set sizes may be typically small and can potentially result in significant savings in optimization time, rule hints can be added to the repertoire of query optimizer hints. The rule hints can provide a hint to the query optimizer to use a smaller set of rules for optimizing a query. Such a hinting mechanism can be useful for queries or stored procedures where the optimization time overheads are non-trivial. Profiling the set of rules that actually influence the plan choice for a particular query provides a way to derive appropriate rule hints for a query.

In one example implementation, the equivalent set of rules for a query may be identified before query optimization by leveraging the equivalent set information of "similar" queries and applying machine learning techniques. Such information would be useful for a meta-optimizer which can tune the optimizer appropriately for each input query. In some cases, the optimization time may actually increase when constrained the number of rules is constrained (see FIG. 20). This increase in time points to interactions between pruning strategies and/or time out mechanisms in the optimizer and the transformation rules.

Certain implications of profiling of transformation rules and query optimizer testing will now be discussed. Profiling can be used for tracking the interaction between rules and pruning of query plans. There may be a tradeoff between optimization time and the quality of the plan output by the query optimizer. In order to enable optimizers to produce plans more quickly irrespective of the complexity of the input queries, modern optimizers use a variety of pruning strategies and/or timeouts etc. These can interact with transformation rules in non-intuitive ways at times.

For example, methods have been described to identify relevant rules for a workload of queries. One may expect the cost of the plan generated by the query optimizer to increase if relevant rules are turned off for the query. However, instances may exist where turning off a relevant rule can sometimes result in a better plan. Though in many of the cases, the cost difference between the plans may be negligible, there are example situations where the difference in estimated cost can be 30% or more (e.g., for around 1% of the cases for the TPC-DS database). Detecting such cases can help query optimizer testers to identify potential interactions between transformation rules and the heuristics used for pruning the search.

Figure 22:
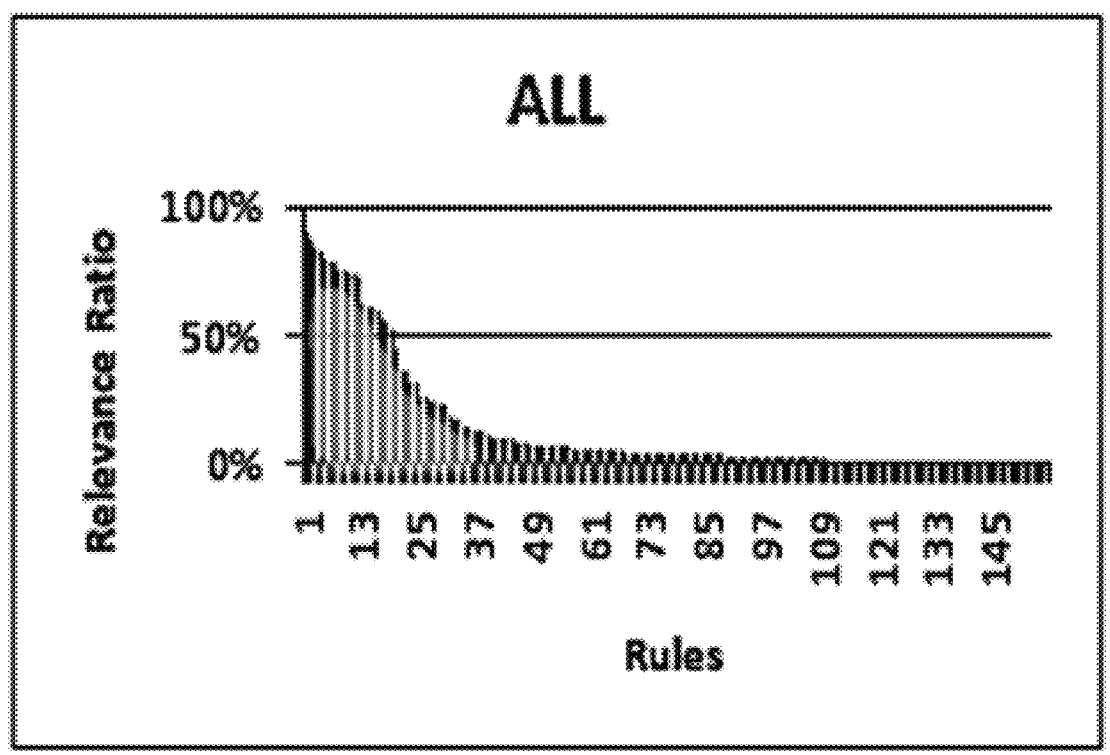
FIG. 22 illustrates an example of a chart of the relevance ratios for the union of workloads.

Another implication of transformation rule profiling can be the ability to measure the coverage of query test suites. The ability to track relevant rules for a workload can be useful for analyzing the query test suite coverage for query optimizers. For instance, consider FIG. 22 which illustrates a plot of the RelevanceRatios for the union of all the workloads described in this disclosure. The number of distinct rules in this plot indicates the total number of rules that are relevant for at least one query in the entire workload. In this case, even after using a diverse set of workloads, only around 40% of the rules may be relevant. Of course, some of the original rules are not syntactically relevant for these workloads (for example, transformation rules in SQL Server that are related to the CUBE operator in SQL). However, tracking this metric for the query test suites can be potentially important for the following reasons discussed below.

Query optimizers can be tested using different workloads that include workload traces from real customer applications, and other synthetic benchmarks. By tracking the relevance ratios we can understand how well certain query test suites cover the optimization rules and if the query test suites need to be augmented with additional queries. If some rules are still not covered in this plot, then the unused rule(s) could potentially indicate a bug in the code that fires the corresponding rule or the unused rule(s) may indicate that a particular rule is too specialized to be useful in real workloads.

Transformation rule profiling can also be used for benchmarking search strategies. Tracking the equivalent set of transformation rules for a query can be useful for benchmarking the current search strategies used in a query optimizer. The time taken to optimize the query using an equivalent set of rules provides a lower bound (for the current query optimizer) on how quickly the optimal plan can be computed for a particular query. By comparing the actual optimization times to this lower bound, the effectiveness of the current search strategy used by the optimizer may be evaluated.

For instance, FIG. 19 shows the reduction in optimization time for the TPC-H workload that can be achieved by using the equivalent set information for each individual query. For some queries, the reduction in optimization time is less than 20%, indicating that the current search strategy is already very effective in pruning the irrelevant rules for these queries. In another example, a first optimization time for the search query using the host set of transformation rules can be compared with a second optimization time using an optimization rule set in order to determine whether a query optimizer can be further tuned to optimize search queries faster.

The idea of plan diagrams was introduced as a way of visually explaining the complexity of the execution plan choices of a query optimizer. By leveraging the relevance information of rules for a workload, simpler plan diagrams may be generated without significantly impacting the plan quality.

The results of profiling of the transformation rules can focus on evaluating the effectiveness of transformation rules using a query optimizer and a diverse set of query workloads. At least two related metrics can be used. One metric can be the equivalent set of rules for a query, and another metric can be the relevant rules for a workload. The equivalent set sizes of most queries can be observed to be small and that there are relatively few rules with high RelevanceRatios. This type of analysis can be potentially leveraged for simplifying plan diagrams, reducing optimization time and testing query optimizers.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for transformation rule profiling for a query optimizer, comprising:
   obtaining a database query configured to be optimized by the query optimizer of a database system;
   finding an optimized query plan for the database query using a host set of transformation rules;
   removing individual transformation rules from a query plan generation, wherein one transformation rule is removed and checked at a time;
   generating a test query plan after one transformation rule has been removed;
   determining whether the test query plan is different than the optimized query plan in the absence of the removed transformation rule;
   defining a relevance ratio for a transformation rule as a fraction of the total generated test query plans for which the transformation rule is relevant;
   creating an equivalent set of transformation rules that includes transformation rules whose relevance ratio exceeds a relevance threshold where the test query plan generated from the equivalent set of transformation rules is equivalent to the optimized plan.

2. The method as in claim 1, further comprising disabling individual transformation rules in the host rule set for each transformation rule that does not cause the test query plan to change as compared to the optimized query plan is removed from the optimization rule set.

3. The method as in claim 1, further comprising using the optimization rule set to determine a lower bound for a time taken for optimizing the search query.

4. The method as in claim 3, wherein a first optimization time for the search query using the host set of transformation rules can be compared with a second optimization time using an equivalent set of transformation rules so as to determine whether a query optimizer can be further tuned to optimize search queries faster.

5. The method as in claim 1, further comprising using the optimized rule set as rule hints for optimizing a search query.

6. The method as in claim 1, further comprising optimizing the query plan using the equivalent set of transformation rules.

7. The method as in claim 6, further comprising:
obtaining search results from the database system for the optimized query plan; and
displaying the search results to an end user.

8. The method as in claim 1, wherein the database system is located on a database server having a processor and memory.

9. A method for transformation rule profiling for a query optimizer of a database system, comprising:
identifying a workload of queries including a plurality of database queries configured to be optimized by the query optimizer of the database system;
finding an optimized query plan for a database query using a host set of transformation rules;
removing individual transformation rules from a query plan generation, wherein one transformation rule is removed and checked at a time;
generating a test query plan after the transformation rule has been removed from the host set of transformation rules;
determining whether the test query plan is identical to the optimized query plan in the absence of the removed transformation rule;
marking a transformation rule as relevant to a database query based on a changed test plan when the transformation rule has been removed;
defining a relevance ratio of a selected rule for a workload of queries as a fraction of queries in the workload of queries where the selected rule is relevant to a query because removal of the transformation rule affects the optimized query plan; and
selecting transformation rules with a relevance ratio that exceed a relevance threshold to be applied to queries using the query optimizer.

10. The method as in claim 9, further comprising determining which transformation rules are useful for at least one database query.

11. The method as in claim 9, further comprising turning off the rules in the query optimizer except the transformation rules with the relevance ratio exceeding the relevance threshold.

12. The method as in claim 9, wherein the relevance threshold is set to select transformation rules relevant to greater than a pre-defined percentage of queries.

13. The method as in claim 9, wherein the transformation rule can be defined as relevant when optimizing the database query with the transformation rule turned off does not significantly change a plan cost identified by the query optimizer.

14. The method as in claim 9, further comprising:
obtaining search results from the database system for the optimized query plan; and
displaying the search results to an end user.

15. The method as in claim 9, wherein the relevance threshold is set to select 10 to 50 transformation rules.

16. The method as in claim 9, wherein the database system is located on a database server having a processor and memory.

17. A system for profiling transformation rules for search queries, comprising:
a database server having a database system, a memory storing a plurality of database queries, and a processor;
a host set of transformation rules comprising a plurality of transformation rules;
a query optimizer configured to use the plurality of transformation rules to optimize the database queries; and
a relevance rule module configured to:
create an equivalent set of transformation rules that includes transformation rules where the transformation rules are used to find an optimized plan for a data query;
find an optimized query plan for a database query using the host set of transformation rules;
remove individual transformation rules in a query plan generation process, wherein one transformation rule is removed and checked at a time;
generate a test query plan after one transformation rule has been removed;
determine whether the test query plan was changed as compared to the optimized query plan in the absence of individual transformation rules;
determine a relevance ratio for the plurality of transformation rules in the host set of transformation rules, the relevance ratio indicative of a ratio for which the selected transformation rule was relevant to a plurality of test query plans; and
create an equivalent set of transformation rules that includes selected transformation rules where a test query plan generated without the selected transformation rule is different than an optimized plan, and wherein the selected transformation rules comprises transformation rules having a relevance ratio that exceeds a relevance threshold.

18. The system as in claim 17, further comprising a relevant rules module to determine which transformation rules are useful for at least one database query.

19. The system as in claim 17, wherein the relevant rules module can be used to find transformation rules that are not used for optimization because the transformation rules have errors.

* * * * *